US011186364B2

(12) United States Patent
Konishi et al.

(10) Patent No.: US 11,186,364 B2
(45) Date of Patent: Nov. 30, 2021

(54) INFORMATION PROCESSING METHOD, CONTROL DEVICE, AND MOBILE TETHERING BODY

(71) Applicant: Panasonic Intellectual Property Management Co., Ltd., Osaka (JP)

(72) Inventors: Kazunobu Konishi, Osaka (JP); Stephen William John, Nara (JP); Kazuo Inoue, Osaka (JP); Katsuhiko Asai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 382 days.

(21) Appl. No.: 16/454,273

(22) Filed: Jun. 27, 2019

(65) Prior Publication Data

US 2020/0010190 A1 Jan. 9, 2020

(30) Foreign Application Priority Data

Jul. 3, 2018 (JP) .............................. JP2018-126716

(51) Int. Cl.
*B64C 39/02* (2006.01)

(52) U.S. Cl.
CPC .......... *B64C 39/022* (2013.01); *B64C 39/024* (2013.01); *B64C 2201/145* (2013.01); *B64C 2201/148* (2013.01)

(58) Field of Classification Search
CPC ................. B64C 39/022; B64C 2201/148
USPC ...................................................... 244/17.17
See application file for complete search history.

(56) References Cited

U.S. PATENT DOCUMENTS

| 7,631,834 | B1* | 12/2009 | Johnson | ............... B64C 39/024 |
| | | | | 244/17.11 |
| 8,777,157 | B2* | 7/2014 | Barrett | .................. B64C 39/022 |
| | | | | 244/115 |
| 10,266,259 | B1* | 4/2019 | Van Alsenoy | ........ B64C 39/024 |
| 10,364,026 | B1* | 7/2019 | Hanlon | ..................... B64F 3/02 |
| 10,384,777 | B1* | 8/2019 | Welsh | ....................... B64F 3/02 |
| 10,435,154 | B1* | 10/2019 | Buyse | ............. G08B 13/19643 |

(Continued)

FOREIGN PATENT DOCUMENTS

| CA | 2844885 A1 * | 9/2014 | ............ A63H 30/02 |
| CA | 3018601 A1 * | 9/2017 | ............ B64D 47/08 |

(Continued)

*Primary Examiner* — Christopher P Ellis
(74) *Attorney, Agent, or Firm* — Wenderoth, Lind & Ponack, L.L.P.

(57) ABSTRACT

An information processing method includes the following steps performed using a processor: obtaining first region information indicating a first region; obtaining first position information indicating the position of an unmanned aerial vehicle tethered to a mobile tethering body using a tether; determining, using the first region information and the first position information, a first destination which is a destination of the mobile tethering body; and moving the mobile tethering body to the first destination. The first destination is a position located at least a predetermined distance from a point which is on the boundary of the first region and located the shortest distance from the position of the unmanned aerial vehicle, in the direction from the point on the boundary of the first region to the position of the unmanned aerial vehicle.

9 Claims, 9 Drawing Sheets

(56) References Cited

U.S. PATENT DOCUMENTS

| | | | |
|---|---|---|---|
| 10,676,331 B1* | 6/2020 | Dorsey | B64C 39/024 |
| 2013/0233964 A1* | 9/2013 | Woodworth | G05D 1/104 |
| | | | 244/2 |
| 2014/0263852 A1* | 9/2014 | Walker | H02G 11/02 |
| | | | 244/53 R |
| 2015/0129716 A1* | 5/2015 | Yoffe | B64F 1/0297 |
| | | | 244/110 C |
| 2015/0183517 A1* | 7/2015 | Jensen | F03D 5/06 |
| | | | 244/76 R |
| 2016/0119670 A1 | 4/2016 | Izutsu | |
| 2016/0200437 A1* | 7/2016 | Ryan | B64C 39/022 |
| | | | 244/99.2 |
| 2017/0240277 A1* | 8/2017 | Molnar | B64C 39/022 |
| 2018/0009526 A1* | 1/2018 | Spengler | B64C 39/024 |
| 2018/0251217 A1 | 9/2018 | Ichihara et al. | |
| 2018/0297699 A1* | 10/2018 | Ortiz | G05D 1/104 |
| 2019/0127064 A1* | 5/2019 | Beardsley | B05B 15/652 |
| 2020/0010191 A1* | 1/2020 | Asai | H04W 4/40 |
| 2020/0310466 A1* | 10/2020 | Fischer | B64C 39/024 |
| 2021/0107685 A1* | 4/2021 | Paz Duart | B64F 1/06 |

FOREIGN PATENT DOCUMENTS

| | | | | |
|---|---|---|---|---|
| JP | 2887597 | | 4/1999 | |
| JP | 2017-217942 | | 12/2017 | |
| JP | 2017-225178 | | 12/2017 | |
| JP | 6261830 | | 1/2018 | |
| JP | 6426643 | | 11/2018 | |
| WO | WO-2007141795 A1 | * | 12/2007 | B64C 39/022 |
| WO | WO-2012094430 A2 | * | 7/2012 | G03B 15/006 |
| WO | 2017/038809 | | 3/2017 | |
| WO | WO-2018023031 A2 | * | 2/2018 | B64C 39/024 |
| WO | WO-2018232010 A1 | * | 12/2018 | B64C 39/022 |
| WO | WO-2019226917 A1 | * | 11/2019 | B64D 47/08 |

* cited by examiner

INFORMATION PROCESSING METHOD, CONTROL DEVICE, AND MOBILE TETHERING BODY

CROSS REFERENCE TO RELATED APPLICATION

This application claims the benefit of priority of Japanese Patent Application Number 2018-126716 filed on Jul. 3, 2018, the entire content of which is hereby incorporated by reference.

BACKGROUND

Technical Field

The present disclosure relates to information processing methods, control devices, and mobile tethering body for unmanned aerial vehicles which are tethered using tethers

Description of the Related Art

It is necessary to implement safety measures when unmanned aerial vehicles (UAVs) such as drones and unmanned aircraft fly over an event site to take photographs, for example. For example, there is a safety measure set by the Japanese Ministry of Land, Infrastructure, Transport and Tourism which designates, as a restricted area prohibiting human entry, an area centered on an unmanned aerial vehicle and covering a distance dependent on the flight altitude of the unmanned aerial vehicle. However, when this safety measure is implemented, it is problematic in that the unmanned aerial vehicle cannot approach a subject such as a person to take photographs. In view of this, the regulation establishes that when a tether of a tethering device is attached to an unmanned aerial vehicle or when a protection net for unmanned aerial vehicles is installed at an event site, no restricted area is required.

For example, Japanese Patent No. 2887597 discloses a technique for limiting the flight range of an unmanned aerial vehicle by attaching a tether to the unmanned aerial vehicle, and Japanese Unexamined Patent Application Publication No. 2017-217942 discloses a technique for enabling the tether to have a variable length; such tethers can be used to implement safety measures.

SUMMARY

However, if any problem occurs with unmanned aerial vehicles tethered using tethers such as those disclosed in Japanese Patent No. 2887597 and Japanese Unexamined Patent Application Publication No. 2017-217942 when the unmanned aerial vehicles fly in the vicinity of a boundary of a permissible flight zone, the unmanned aerial vehicles may cross the boundary into a no-fly zone where there may be persons or the like, and crash into the ground even when the unmanned aerial vehicles are connected to the tethers.

In view of this, an object of the present disclosure is to provide an information processing method, etc., which enables improvement in safety outside a region where an unmanned aerial vehicle flies.

An information processing method according to an aspect of the present disclosure includes the following steps performed using a processor: obtaining first region information indicating a first region; obtaining first position information indicating a position of an unmanned aerial vehicle tethered to a mobile tethering body using a tether; determining, using the first region information and the first position information, a first destination which is a destination of the mobile tethering body; and moving the mobile tethering body to the first destination. The first destination is a position located at least a predetermined distance from a point which is on a boundary of the first region and located the shortest distance from the position of the unmanned aerial vehicle, in a direction from the point on the boundary of the first region to the position of the unmanned aerial vehicle.

Note that the aforementioned general or specific aspects may be implemented using a system, a device, a method, an integrated circuit, a computer program, or a non-transitory computer-readable recording medium such as a compact disc read-only memory (CD-ROM), or any combination of systems, devices, methods, integrated circuits, computer programs, or recording media.

With the information processing method, etc., according to an aspect of the present disclosure, it is possible to improve the safety outside a region where an unmanned aerial vehicle flies.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

An information processing method according to an aspect of the present disclosure includes the following steps performed using a processor: obtaining first region information indicating a first region; obtaining first position information indicating a position of an unmanned aerial vehicle tethered to a mobile tethering body using a tether; determining, using the first region information and the first position information, a first destination which is a destination of the mobile tethering body; and moving the mobile tethering body to the first destination. The first destination is a position located at least a predetermined distance from a point which is on a boundary of the first region and located the shortest distance from the position of the unmanned aerial vehicle, in a direction from the point on the boundary of the first region to the position of the unmanned aerial vehicle.

Thus, the first destination of the mobile tethering body is determined according to the position of the unmanned aerial vehicle so that a point on a boundary of the first region that is located the shortest distance from the position of the unmanned aerial vehicle, the unmanned aerial vehicle, and the mobile tethering body are linearly aligned in the stated order. When the length of the tether is adjusted so as not to increase any more in the aforementioned state where those are linearly aligned, the position in the aforementioned state is where the unmanned aerial vehicle is closest to the boundary, within the range of possible movement of the unmanned aerial vehicle that is limited by the tether and centered on the mobile tethering body. In other words, even if the unmanned aerial vehicle runs out of control, for example, the unmanned aerial vehicle cannot move closer to the boundary than to the position in the aforementioned state, and thus it is possible to keep the unmanned aerial vehicle from crossing the boundary into the no-fly zone, making it possible to improve the safety outside the region where the unmanned aerial vehicle flies.

Furthermore, the first position information may indicate, as the position of the unmanned aerial vehicle, a second destination which is a destination of the unmanned aerial vehicle, and the mobile tethering body may be moved to the first destination according to movement of the unmanned aerial vehicle to the second destination.

Thus, the first destination which is a destination of the mobile tethering body is determined according to the second destination which is a destination of the unmanned aerial vehicle, instead of the current position thereof, making it possible to move the mobile tethering body to the first destination along with the movement of the unmanned aerial vehicle. Therefore, it is possible to move the mobile tethering body earlier to the first destination at which the mobile tethering body can keep the unmanned aerial vehicle from entering the no-fly zone, making it possible to further improve the safety outside the region where the unmanned aerial vehicle flies.

Furthermore, the tether may have a length dependent on the predetermined distance.

Thus, the length of the tether can be determined according to the predetermined distance.

Furthermore, the tether may be variable in length, and the mobile tethering body may change the length of the tether according to the positional relationship between the unmanned aerial vehicle and the mobile tethering body.

Thus, the length of the tether can be adjusted so as to prevent slacking of the tether even when the unmanned aerial vehicle moves toward the mobile tethering body.

Furthermore, the predetermined distance may be less than or equal to a radius of curvature of the boundary at the point.

As the tether becomes longer, the movement of the unmanned aerial vehicle on a circle having a radius equal to the length of the tether becomes closer to linear motion, and even when the unmanned aerial vehicle moves on the circle, it is possible to keep the unmanned aerial vehicle as if the unmanned aerial vehicle were moving close to a straight boundary, for example. However, the boundary is not necessarily straight and may be curved. If the predetermined distance is greater than the radius of curvature of a curved boundary at a point on the boundary that is located the shortest distance from the position of the unmanned aerial vehicle, the unmanned aerial vehicle that is moving on the circle may cross the boundary into the no-fly zone. In view of this, by setting the predetermined distance less than or equal to the radius of curvature of the boundary at the aforementioned point, it is possible to more effectively keep the unmanned aerial vehicle from crossing the boundary into the no-fly zone.

Furthermore, a malfunction of the mobile tethering body may be detected, and the mobile tethering body may shorten the tether when the mobile tethering body approaches the boundary of the first region.

Thus, if the mobile tethering body moves toward the boundary due to a malfunction of the mobile tethering body, the unmanned aerial vehicle also moves toward the boundary the distance the mobile tethering body has moved, which may result in the unmanned aerial vehicle crossing the boundary. In view of this, by shortening the tether, it is possible to keep the unmanned aerial vehicle from crossing the boundary into the no-fly zone even when such a malfunction has occurred.

Furthermore, a malfunction of the mobile tethering body may be detected, and the mobile tethering body may lengthen the tether when the mobile tethering body moves away from the boundary of the first region.

If the mobile tethering body moves away from the boundary due to a malfunction of the mobile tethering body, the unmanned aerial vehicle that is flying near the boundary may be forcibly pulled by the mobile tethering body and crash into the ground. In view of this, by lengthening the tether, it is possible to keep the unmanned aerial vehicle from being forcibly pulled by the mobile tethering body even when such a malfunction has occurred.

A control device according to an aspect of the present disclosure includes a processor which is configured to: obtain first region information indicating a first region; obtain first position information indicating a position of an unmanned aerial vehicle tethered to a mobile tethering body using a tether; determine, using the first region information and the first position information, a first destination which is a destination of the mobile tethering body; and move the mobile tethering body to the first destination. The first destination is a position located at least a predetermined distance from a point which is on a boundary of the first region and located the shortest distance from the position of the unmanned aerial vehicle, in a direction from the point on the boundary of the first region to the position of the unmanned aerial vehicle.

With this, it is possible to provide a control device capable of improving the safety outside a region where an unmanned aerial vehicle flies.

A mobile tethering device according to an aspect of the present disclosure is a mobile tethering body which tethers an unmanned aerial vehicle using a tether and includes a processor which is configured to: obtain first region information indicating a first region; obtain first position information indicating a position of the unmanned aerial vehicle; determine, using the first region information and the first position information, a first destination which is a destination of the mobile tethering body; and move the mobile tethering body to the first destination. The first destination is a position located at least a predetermined distance from a point which is on a boundary of the first region and located the shortest distance from the position of the unmanned aerial vehicle, in a direction from the point on the boundary of the first region to the position of the unmanned aerial vehicle.

With this, it is possible to provide a mobile tethering body capable of improving the safety outside the region where an unmanned aerial vehicle flies.

Furthermore, the aforementioned general or specific aspects may be implemented using a system, a device, a method, an integrated circuit, a computer program, or a non-transitory computer-readable recording medium such as a CD-ROM, or any combination of systems, devices, methods, integrated circuits, computer programs, or recording media.

Hereinafter, an embodiment will be specifically described with reference to the drawings. The embodiment described below shows a general or specific example. The numerical, values, shapes, materials, structural elements, the arrangement and connection of the structural elements, steps, the processing order of the steps etc. shown in the following embodiment are mere examples, and therefore do not limit the scope of the appended Claims. As such, among the structural elements in the following embodiment, structural elements not recited in any one of the independent claims which indicate the broadest concepts will be described as arbitrary structural elements.

Furthermore, the respective figures referred to in the following description are schematic diagrams and thus are not necessarily precise illustrations of the structural elements in terms of position, size, etc.

Embodiment

Hereinafter, an embodiment will be described with reference to FIG. 1 to FIG. 7.

[Configuration of Control Device, etc.]

Figure 1:
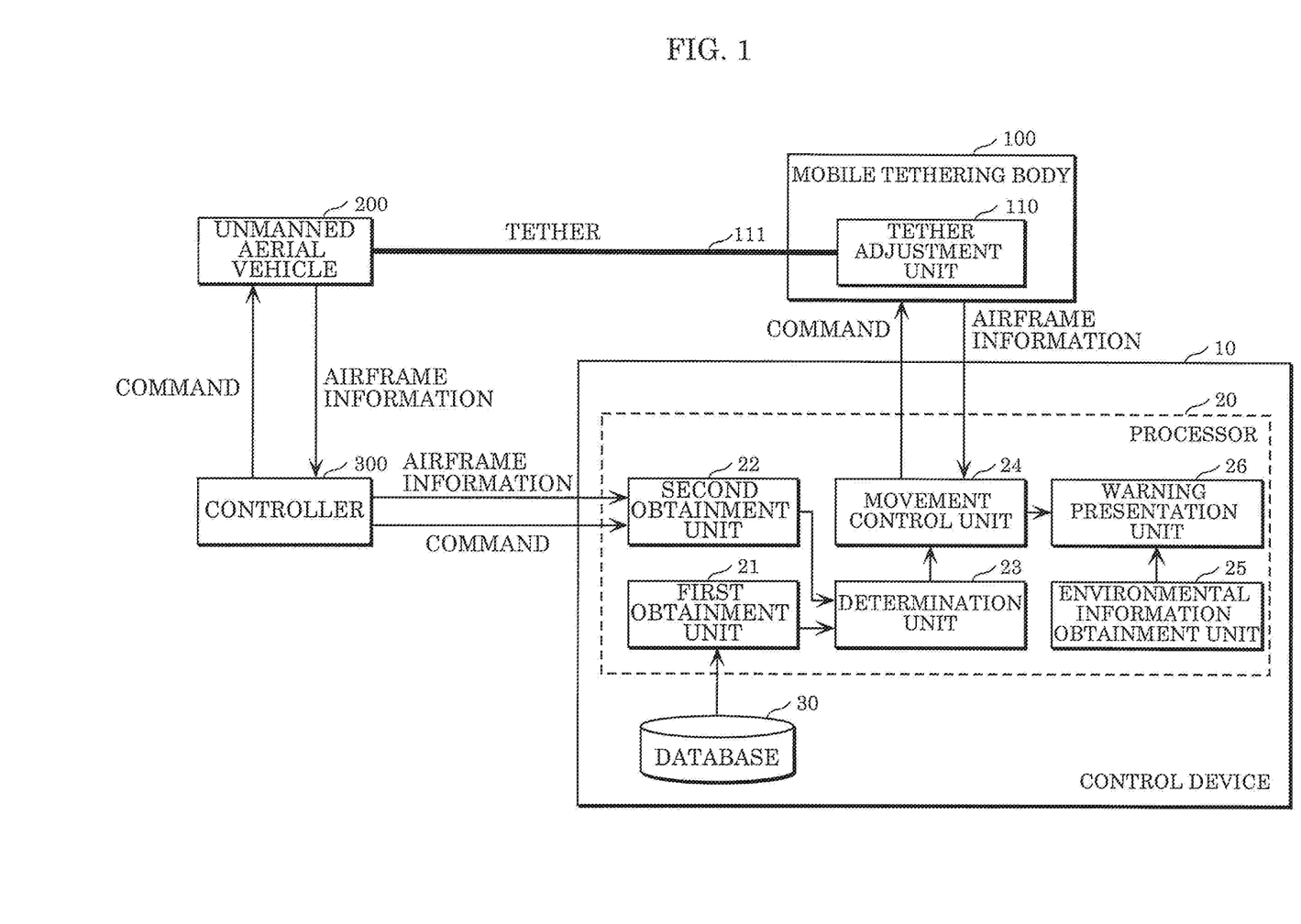
FIG. 1 is a diagram schematically illustrating the configuration of a control device, etc., according to an embodiment.

FIG. 1 is a diagram schematically illustrating the configuration of control device 10, etc., according to the embodiment. Note that FIG. 1 illustrates mobile tethering body 100, unmanned aerial vehicle 200, and controller 300 in addition to control device 10.

Examples of unmanned aerial vehicle (UAV) 200 include flying machines such as drones and unmanned aircraft; by moving an unmanned aerial vehicle equipped with a camera, a microphone, and the like high up into the air, it is possible to capture an image, sound, and the like, at a site where human access is challenging. Unmanned aerial vehicle 200 is used, for example, at an event site. Unmanned aerial vehicle 200 includes, for example, a global positioning system (GPS) for obtaining information on the current position of unmanned aerial vehicle 200.

Controller 300 is a remote controller such as a digital proportional system for controlling (steering) unmanned aerial vehicle 200. Controller 300 is connected to unmanned aerial vehicle 200 in such a manner that allows wireless communication therebetween. Controller 300 transmits, to unmanned aerial vehicle 200, a command for moving (for example, moving upward, downward, forward, backward, leftward, and rightward, or turning) unmanned aerial vehicle 200. Unmanned aerial vehicle 200 transmits, to controller 300, airframe information including information on the current position of unmanned aerial vehicle 200 and information indicating whether or not there is any malfunction (such as a lack of power supply, airframe abnormality, signal abnormality, and running out of control) in unmanned aerial vehicle 200.

Mobile tethering body 100 is a device for tethering unmanned aerial vehicle 200 using tether 111. Mobile tethering body 100 is not fixed to the ground and is configured to be movable. For example, mobile tethering body 100 has wheels or the like and is capable of traveling on the ground according to an external command. In this case, in order to fulfill the need to tether unmanned aerial vehicle 200, mobile tethering body 100 has a mass large enough not to be moved by the propulsive force of unmanned aerial vehicle 200. For example, the length of tether 111 is dependent on a predetermined distance to be described later. The length of tether 111 is variable and is adjusted using tether adjustment unit 110 included in mobile tethering body 100. Mobile tethering body 100 includes, for example, a global positioning system (GPS) for obtaining information on the current position of mobile tethering body 100. Mobile tethering body 100 is connected to control device 10 in such a manner that allows wireless communication therebetween. Mobile tethering body 100 transmits, to control device 10, airframe information including information on the current position of mobile tethering body 100 and information indicating whether or not there is any malfunction (such as a lack of power supply, airframe abnormality, signal abnormality, and running out of control) in mobile tethering body 100.

Tether adjustment unit 110 includes, for example: a drum (reel) around which tether 111 is wound; a motor which rotates the drum; and a motor control unit which controls driving of the motor. As a result of the motor control unit driving the motor according to an external command, the direction and amount of rotation of the drum are controlled, and thus the length of tether 111 is adjusted.

Control device 10 is for improving the safety of unmanned aerial vehicle 200. Control device 10 is, for example, a personal computer (PC) or the like installed at an event site or the like. Control device 10 includes first obtainment unit 21, second obtainment unit 22, determination unit 23, movement control unit 24, environmental information obtainment unit 25, warning presentation unit 26, and database 30. Control device 10 includes, for example, processor 20 (which may be a microprocessor), a memory, a communication circuit, and the like. The communication circuit may include an antenna or the like. The memory is a read-only memory (ROM), a random-access memory (RAM), or the like and is capable of storing a control program that is executed by processor 20. Database 30 may be stored in this memory or may be stored in another memory. First obtainment unit 21, second obtainment unit 22, determination unit 23, movement control unit 24, environmental information obtainment unit 25, and warning presentation unit 26 are provided using, for example, a communication circuit and processor 20 which executes a control program stored in a memory in control device 10. First obtainment unit 21, second obtainment unit 22, determination unit 23, movement control unit 24, environmental information obtainment unit 25, warning presentation unit 26, and database 30 will be described with reference to FIG. 2.

[Operation of Control Device]

Figure 2:
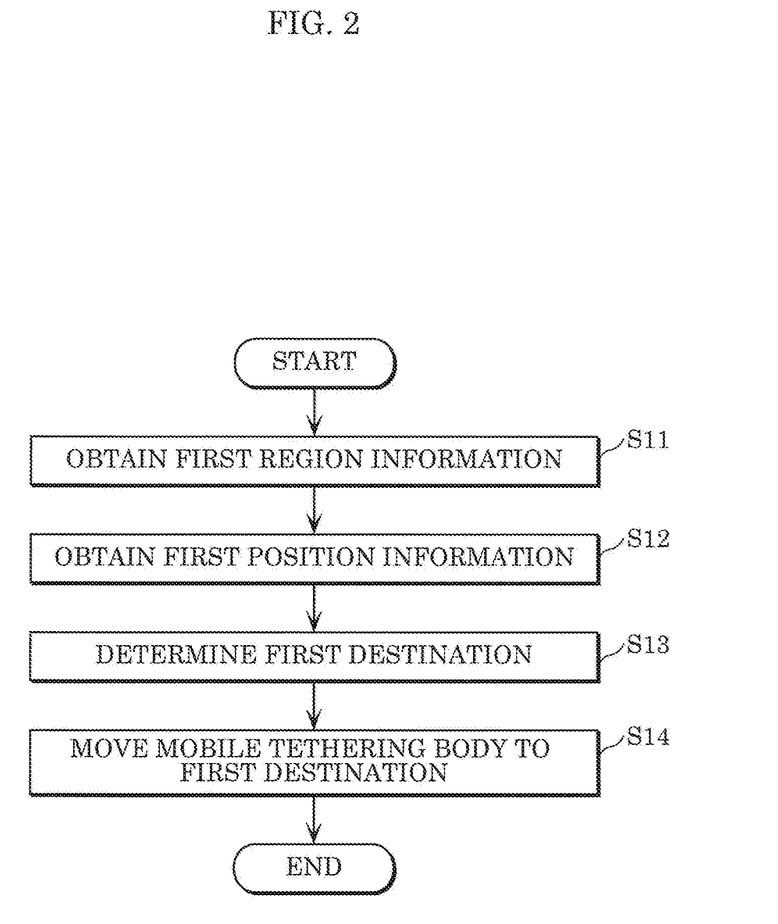
FIG. 2 is a flowchart illustrating an example of an operation of a control device according to an embodiment.

FIG. 2 is a flowchart illustrating an example of the operation of control device 10 according to the embodiment.

First obtainment unit 21 obtains first region information indicating a first region (Step S11). For example, the first region is a no-fly zone, and the first region information includes information on the position, range, boundary, or the like of the no-fly zone. Note that the first region may be a permissible flight zone, and the first region information may include information on the position, range, boundary, or the like of the permissible flight zone. This means that the first region may either be a no-fly zone or a permissible flight zone. In the present disclosure, it is sufficient that the boundary between the no-fly zone and the permissible flight zone be clear; this is because the boundary of the no-fly zone and the boundary of the permissible flight zone are the same. Note that the first region information is not required to include boundary information; it is sufficient that the first region information include information that can be used to calculate a boundary. In the present embodiment, the no-fly zone is set to the first region. The permissible flight zone is also referred to as the second region. The first region information is included in database 30 in advance, for example, and first obtainment unit 21 obtains the first region information from database 30. Note that the first region information may be stored in an external server or the like, and first obtainment unit 21 may obtain the first region information from the external server or the like.

Second obtainment unit 22 obtains first position information indicating the position of unmanned aerial vehicle 200 tethered to mobile tethering body 100 using tether 111 (Step S12). For example, control device 10 is connected to controller 300 in such a manner that allows wireless communication therebetween. Second obtainment unit 22 obtains, via controller 300, airframe information including information on the position of unmanned aerial vehicle 200. Furthermore, second obtainment unit 22 obtains, from controller 300, a command for moving unmanned aerial vehicle 200. The destination of unmanned aerial vehicle 200 can be estimated using the current position of unmanned aerial vehicle 200 and a command indicating how to move unmanned aerial vehicle 200 from that position. In this manner, second obtainment unit 22 obtains the first position information indicating, as the position of unmanned aerial vehicle 200, the second destination which is a destination of unmanned aerial vehicle 200.

Note that control device 10 may be connected to unmanned aerial vehicle 200 in such a manner that allows wireless communication therebetween, and second obtainment unit 22 may obtain airframe information of unmanned aerial vehicle 200 and the aforementioned command from unmanned aerial vehicle 200 without passing through controller 300. In other words, unmanned aerial vehicle 200 may transmit the information on the current position to control device 10 and may transfer, to control device 10, the command received from controller 300.

Determination unit 23 determines, using the first region information and the first position information, the first destination which is a destination of mobile tethering body 100 (Step S13). The first destination will be described with reference to later-described FIG. 4 and FIG. 5.

Subsequently, movement control unit 24 moves mobile tethering body 100 to the first destination (Step S14). For example, movement control unit 24 transmits, to mobile tethering body 100, a command for moving mobile tethering body 100 to the first destination, and mobile tethering body 100 moves itself to the first destination according to the command. Movement control unit 24 receives the airframe information including the information on the current position of mobile tethering body 100, and thus can determine whether or not mobile tethering body 100 has successfully moved to the first destination.

Environmental information obtainment unit 25 obtains environmental information such as wind speed and precipitation around, for example, an event site where unmanned aerial vehicle 200 is flying. For example, environmental information obtainment unit 25 obtains the environmental information from an external server or the like.

For example, when the environmental information exceeds a predetermined criterion or when the airframe information of unmanned aerial vehicle 200 indicates a malfunction or when the airframe information of mobile tethering body 100 indicates a malfunction, warning presentation unit 26 presents the malfunction using a lamp, sound, wireless communication, and the like. With this, a user can respond to the malfunction. This response will be described later.

[Conventional Problem]

In the present disclosure, mobile tethering body 100 which is capable of moving is used as a device for tethering unmanned aerial vehicle 200, but a fixed tethering unit which is fixed to the ground or the like has been conventionally used. Here, a problem that occurs when the fixed tethering unit is used will be described with reference to FIG. 3A and FIG. 3B.

Figure 3A:
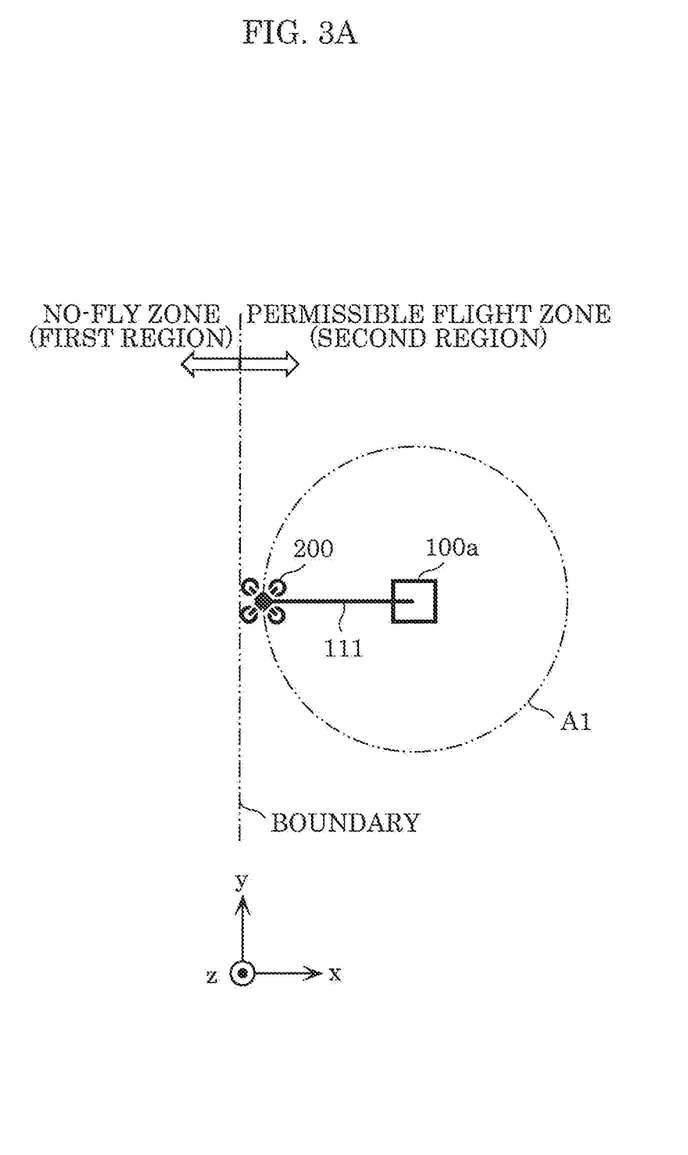
FIG. 3A is a diagram for describing a conventional problem.
Figure 3B:
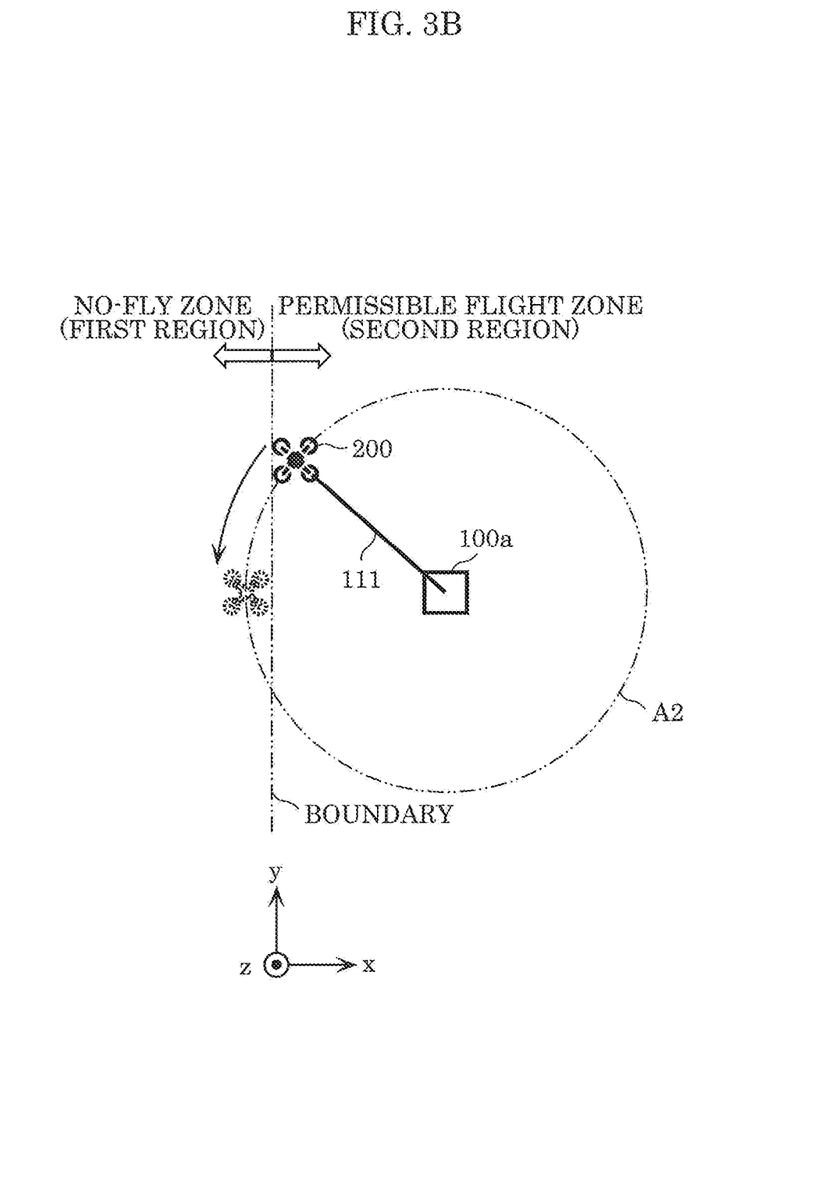
FIG. 3B is a diagram for describing a conventional problem.

FIG. 3A and FIG. 3B are diagrams for describing the conventional problem. In FIG. 3A and FIG. 3B, the z-axis extends vertically, and the x-axis and the y-axis each intersect the z-axis at a right angle (extend horizontally) and intersect each other at a right angle. This is also the case with FIG. 5 to FIG. 7 to be described later. FIG. 3A and FIG. 3B illustrate fixed tethering unit 100a and unmanned aerial vehicle 200 viewed from above in the air (along the z-axis). This is also the case with FIG. 4 to FIG. 5 to be described later.

FIG. 3A illustrates a situation in which unmanned aerial vehicle 200 is flying in the second region, in the vicinity of the boundary. Here, the length of tether 111 is fixed to keep unmanned aerial vehicle 200 from crossing the boundary into the first region unless, for example, unmanned aerial vehicle 200 moves to another position in the second region that is very distant from the current position. As a result, range A1 illustrated in FIG. 3A, which has a radius equal to the length of tether 111 and in which unmanned aerial vehicle 200 can move, does not reach the first region, and thus it is possible to keep unmanned aerial vehicle 200 from crossing the boundary.

Next, when unmanned aerial vehicle 200 in the state illustrated in FIG. 3A is moving on the positive side of the y-axis along the boundary, unmanned aerial vehicle 200 can only move within range A1 as long as tether 111 has the length illustrated in FIG. 3A, and therefore unmanned aerial vehicle 200 cannot move to a position illustrated in FIG. 3B that is outside range A1 in the second region. In view of this, fixed tethering unit 100a includes a function of changing the length of tether 111, enabling unmanned aerial vehicle 200 to move to the position illustrated in FIG. 3B.

In this case, however, range A2 illustrated in FIG. 3B, which has a radius equal to the length of tether 111 and in which unmanned aerial vehicle 200 can move, extends beyond the boundary and overlaps the first region. Therefore, if, for example, unmanned aerial vehicle 200 runs out of control and moves in the direction indicated by the arrow in FIG. 3B, unmanned aerial vehicle 200 ends up crossing the boundary into the first region. Thus, in the conventional case where fixed tethering unit 100a is used, the safety outside the region where unmanned aerial vehicle 200 flies has not been ensured.

In order to solve such a problem, mobile tethering body 100 which is capable of moving is used as a device for tethering unmanned aerial vehicle 200 in the present disclosure, as mentioned above. Specifically, mobile tethering body 100 is moved to the first destination, enabling improvement in the safety outside the region where unmanned aerial vehicle 200 flies.

[Details of First Destination]

Here, the first destination will be explained with reference to FIG. 4.

Figure 4:
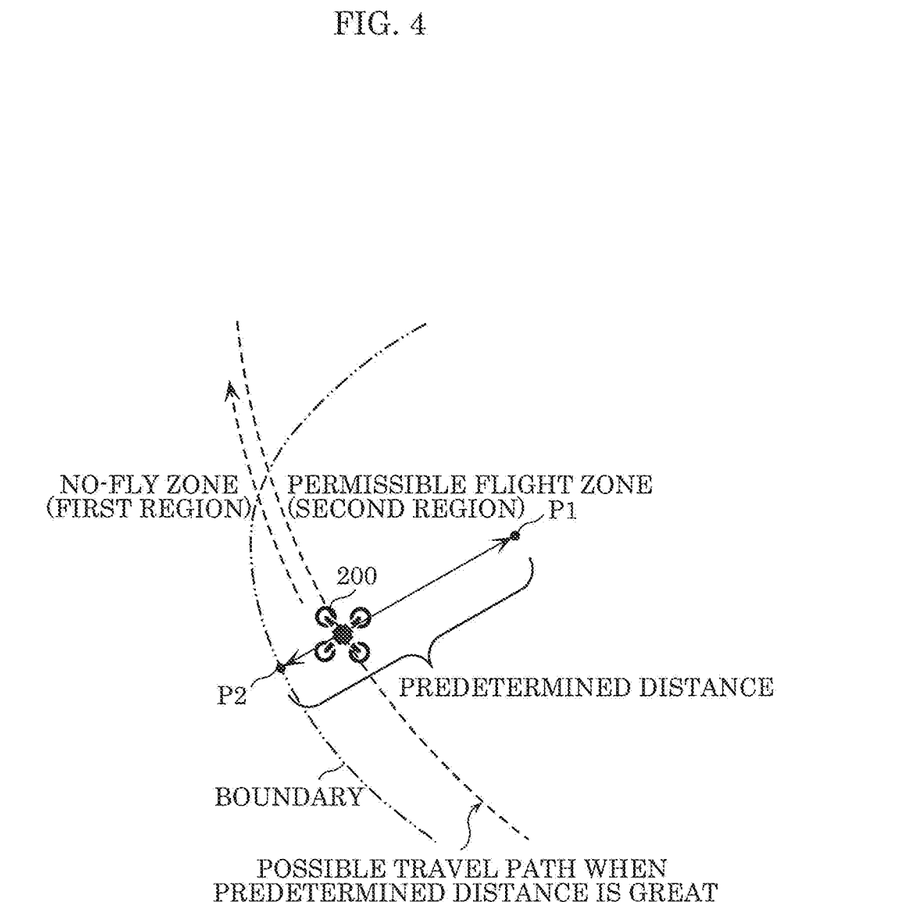
FIG. 4 is a diagram for describing a method for determining a first destination.

FIG. 4 is a diagram for describing a method for determining the first destination. In FIG. 4, the first destination is denoted as P1.

First destination P1 is a position located at least a predetermined distance from point P2, which is on the boundary of the first region and located the shortest distance from the position of unmanned aerial vehicle 200 indicated in the first position information, for example, when viewed from above (along the z-axis), in the direction from point P2 on the boundary of the first region to the position of unmanned aerial vehicle 200. The direction from point P2 to the position of unmanned aerial vehicle 200 is a direction perpendicular to the direction of a tangent to the boundary at point P2. In FIG. 4, the distance between first destination P1 and point P2 is denoted as the predetermined distance. The predetermined distance is set, as appropriate, to meet a specific condition. For example, the predetermined distance is set less than or equal to the radius of curvature of the boundary at point P2. Advantageous effects produced by setting the predetermined distance less than or equal to the radius of curvature will be described below.

As tether 111 becomes longer, the movement of unmanned aerial vehicle 200 on a circle having a radius equal to the length of tether 111 becomes closer to linear motion, and even when unmanned aerial vehicle 200 moves on the circle, it is possible to keep unmanned aerial vehicle 200 as if unmanned aerial vehicle 200 were moving close to a straight boundary, for example. However, the boundary is not necessarily straight and may be curved, as illustrated in FIG. 4. If the predetermined distance is greater than the radius of curvature of a curved boundary at point P2 on the boundary that is located the shortest distance from the position of unmanned aerial vehicle 200, unmanned aerial vehicle 200 that is moving on the circle may cross the boundary into the first region. Specifically, if the predetermined distance is greater than the aforementioned radius of curvature, the range of possible movement of unmanned aerial vehicle 200 is the range of a large circle (indicated by the dash line in FIG. 4), and unmanned aerial vehicle 200 that is moving on the circle along the direction indicated by the dashed arrow in FIG. 4 may cross the boundary into the first region. In view of this, by setting the predetermined distance less than or equal to the radius of curvature of the boundary at point P2, the range of possible movement of unmanned aerial vehicle 200 becomes the range of a small circle, making it possible to more effectively keep unmanned aerial vehicle 200 from crossing the boundary into the first region.

In this manner, the predetermined distance is set, and first destination P1 is set to a position located at least the predetermined distance from point P2 in the direction from point P2 to the position of unmanned aerial vehicle 200.

Next, a specific example of the movement of mobile tethering body 100 to the first destination will be described with reference to FIG. 5.

Figure 5:
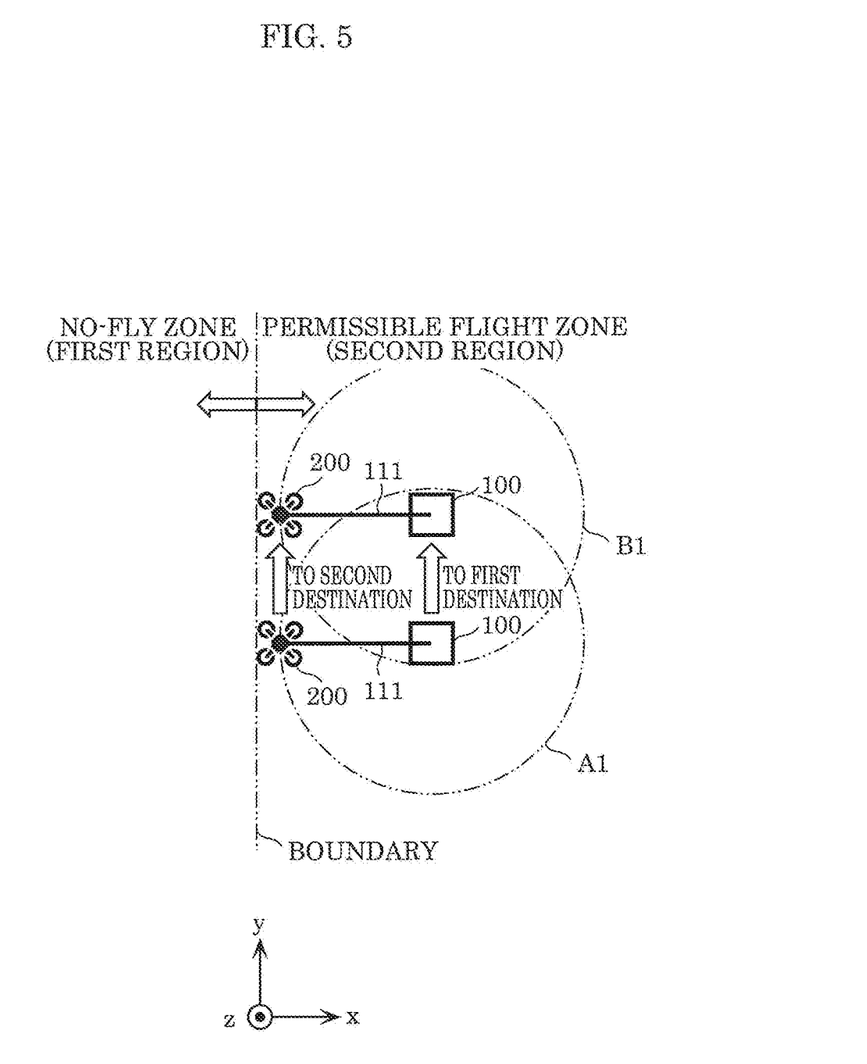
FIG. 5 is a diagram illustrating a specific example of the movement of a mobile tethering body to the first destination.

FIG. 5 is a diagram illustrating a specific example of the movement of mobile tethering body 100 to the first destination. FIG. 5 illustrates mobile tethering body 100 and unmanned aerial vehicle 200 before moved and mobile tethering body 100 and unmanned aerial vehicle 200 after moved. Mobile tethering body 100 and unmanned aerial vehicle 200 before moved are illustrated on the negative side of the y-axis, and mobile tethering body 100 and unmanned aerial vehicle 200 after moved are illustrated on the positive side of the y-axis.

Mobile tethering body 100 before moved is located at least the predetermined distance from the point on the boundary of the first region that is located the shortest distance from the position of unmanned aerial vehicle 200 before moved, in the direction from the point to the position of that unmanned aerial vehicle 200. The length of tether 111 is dependent on the predetermined distance and is fixed to keep unmanned aerial vehicle 200 from crossing the boundary into the first region unless, for example, unmanned aerial vehicle 200 moves to another position in the second region that is very distant from the current position. As a result, range A1 illustrated in FIG. 5, which has a radius equal to the length of tether 111 and in which unmanned aerial vehicle 200 before moved can move, does not reach the first region, and thus it possible to keep unmanned aerial vehicle 200 before moved from crossing the boundary. Note that processor 20 may cause mobile tethering body 100 to change the length of tether 111 according to the positional relationship between unmanned aerial vehicle 200 and mobile tethering body 100. For example, when unmanned aerial vehicle 200 and mobile tethering body 100 approach each other, if the length of tether 111 is fixed, slack will develop in tether 111. In view of this, when the position of unmanned aerial vehicle 200 and the position of mobile tethering body 100 approach each other, tether 111 is shortened to the extent that no slack will develop therein. For example, processor 20 controls a motor control unit, which is used to rotate a drum with tether 111 wound thereon, to apply, to the drum, a force that is great enough to prevent slacking of tether 111, but with no impact on the movement of unmanned aerial vehicle 200. Thus, the length of tether 111 can be adjusted so as to prevent slacking of tether 111 even when unmanned aerial vehicle 200 moves toward mobile tethering body 100.

Next, second obtainment unit 22 obtains first position information indicating the second destination of unmanned aerial vehicle 200 as the position of unmanned aerial vehicle 200, and movement control unit 24 causes mobile tethering body 100 to the first destination according to the movement of unmanned aerial vehicle 200 to the second destination. Specifically, movement control unit 24 causes mobile tethering body 100 to the first destination along with the movement of unmanned aerial vehicle 200 to the second destination instead of causing mobile tethering body 100 to the first destination after the movement of unmanned aerial vehicle 200 to the second destination. Thus, the first destination of mobile tethering body 100 is determined according to the second destination which is a destination of unmanned aerial vehicle 200, instead of the current position thereof, making it possible to move mobile tethering body 100 to the first destination along with the movement of unmanned aerial vehicle 200. Therefore, it is possible to move mobile tethering body 100 earlier to the first destination at which mobile tethering body 100 can keep unmanned aerial vehicle 200 from entering the first region, making it possible to further improve the safety outside the region where unmanned aerial vehicle 200 flies. Specifically, range B1 illustrated in FIG. 5, which has a radius equal to the length of tether 111 and in which unmanned aerial vehicle 200 after moved can move, does not reach the first region, and thus it is possible to keep unmanned aerial vehicle 200 after moved from crossing the boundary.

[Conventional Problem with Mobile Tethering Body Traveling on the Ground]

Although mobile tethering body 100 traveling on the ground has been described so far, the following problem may occur in this case. This will be described with reference to FIG. 6A and FIG. 6B.

Figure 6A:
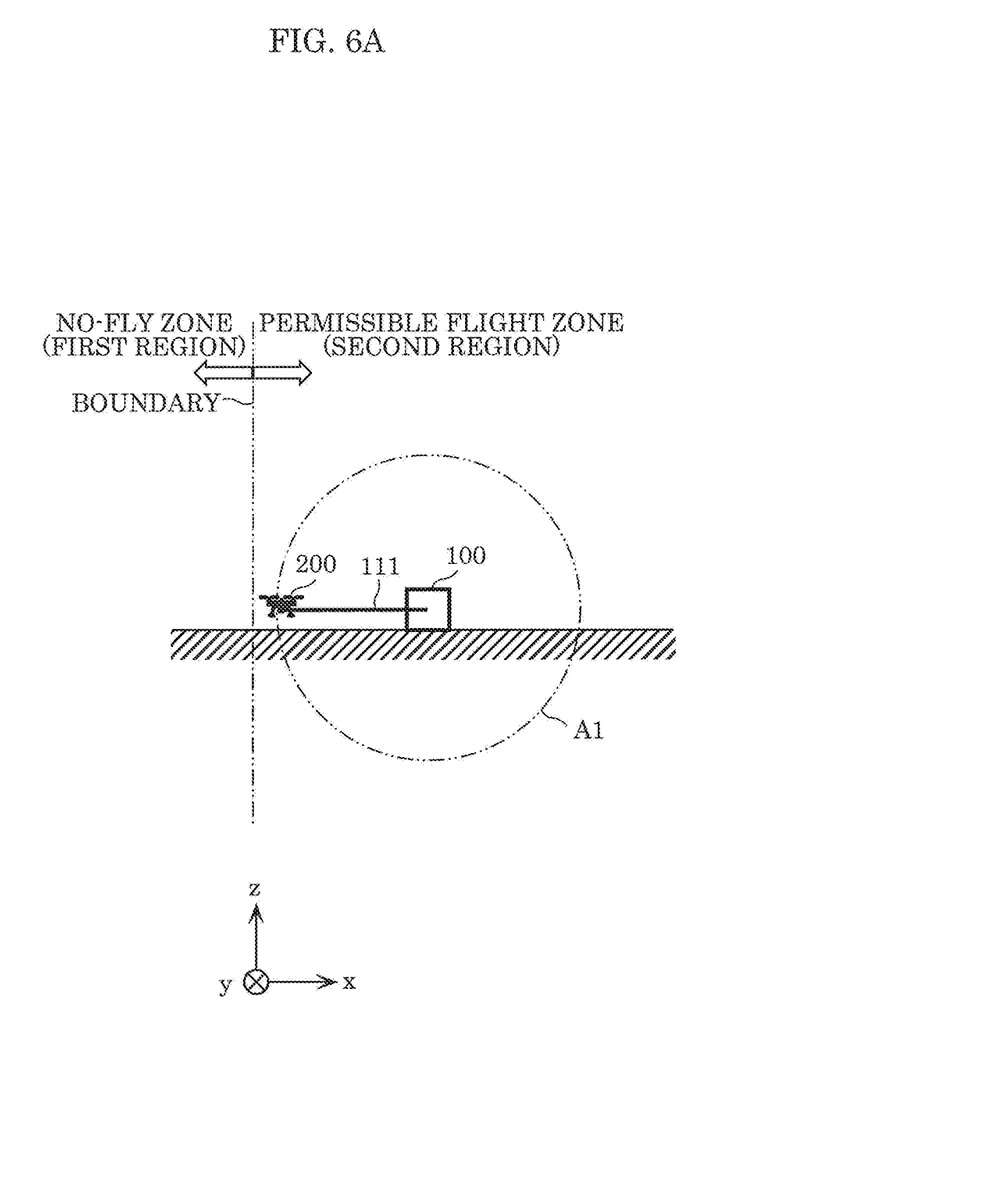
FIG. 6A is a diagram for describing a problem that occurs when a mobile tethering body moves on the ground.
Figure 6B:
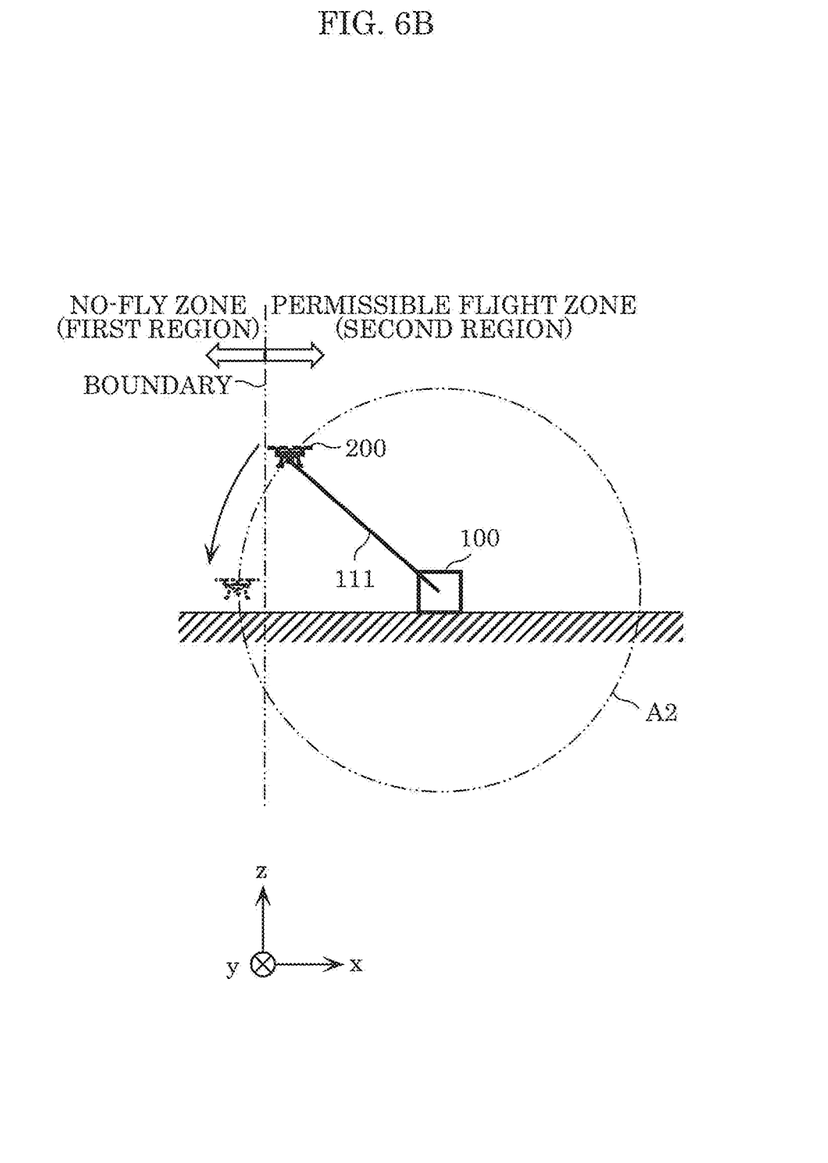
FIG. 6B is a diagram for describing a problem that occurs when a mobile tethering body moves on the ground.

FIG. 6A and FIG. 6B are diagrams for describing a problem that occurs when mobile tethering body 100 moves on the ground (when mobile tethering body 100 is incapable of flying). FIG. 6A and FIG. 6B illustrate mobile tethering body 100 and unmanned aerial vehicle 200 viewed horizontally (along the y-axis).

FIG. 6A illustrates a situation in which unmanned aerial vehicle 200 is flying in the second region, in the vicinity of the boundary. Here, the length of tether 111 is fixed to keep unmanned aerial vehicle 200 from crossing the boundary into the first region unless, for example, unmanned aerial vehicle 200 moves to another position in the second region that is very distant from the current position. As a result, range A1 illustrated in FIG. 6A, which has a radius equal to the length of tether 111 and in which unmanned aerial vehicle 200 can move, does not reach the first region, and thus it possible to keep unmanned aerial vehicle 200 from crossing the boundary.

Next, when unmanned aerial vehicle 200 in the state illustrated in FIG. 6A is moving on the positive side of the z-axis along the boundary, unmanned aerial vehicle 200 can only move within range A1 as long as tether 111 has the length illustrated in FIG. 6A, and therefore unmanned aerial vehicle 200 cannot move to a position illustrated in FIG. 6B that is outside range A1 in the second region. In view of this, mobile tethering body 100 includes a function of changing the length of tether 111, enabling unmanned aerial vehicle 200 to move to the position illustrated in FIG. 6B.

In the case where mobile tethering body 100 is at the first destination, as illustrated in FIG. 5, the movement of unmanned aerial vehicle 200 in the x-y plane (horizontal plane) when viewed from above (along the z-axis) does not result in unmanned aerial vehicle 200 crossing the boundary into the first region. In the case of FIG. 5, the horizontal direction is the direction to the position of unmanned aerial vehicle 200 from a point on the boundary of the first region that is located the shortest distance from the position of unmanned aerial vehicle 200, and the vertical movement of unmanned aerial vehicle 200 is not considered.

When horizontally viewed, however, range A2 illustrated in FIG. 6B, which has a radius equal to the length of tether 111 and in which unmanned aerial vehicle 200 can move, extends beyond the boundary and overlaps the first region. Therefore, if, for example, unmanned aerial vehicle 200 runs out of control and moves in the direction indicated by the arrow in FIG. 6B, unmanned aerial vehicle 200 ends up crossing the boundary into the first region. Thus, the movement of unmanned aerial vehicle 200 in the x-z plane (vertical plane) when viewed horizontally (along the y-axis) may result in unmanned aerial vehicle 200 crossing the boundary into the first region. This is because, when horizontally viewed, a position located at least the predetermined distance from a point on the boundary of the first region that is located the shortest distance from the position of unmanned aerial vehicle 200 in the air, in the direction from the point to the position of unmanned aerial vehicle 200, is at the same height as unmanned aerial vehicle 200; in the case where mobile tethering body 100 is incapable of flying, mobile tethering body 100 cannot reach that position.

In order to solve such a problem, examples of mobile tethering body 100 may include flying machines such as drones, unmanned aircraft, and unmanned aerial vehicles (UAVs). This will be described with reference to FIG. 7.

[Case where Mobile Tethering Body is Flying Machine]

Figure 7:
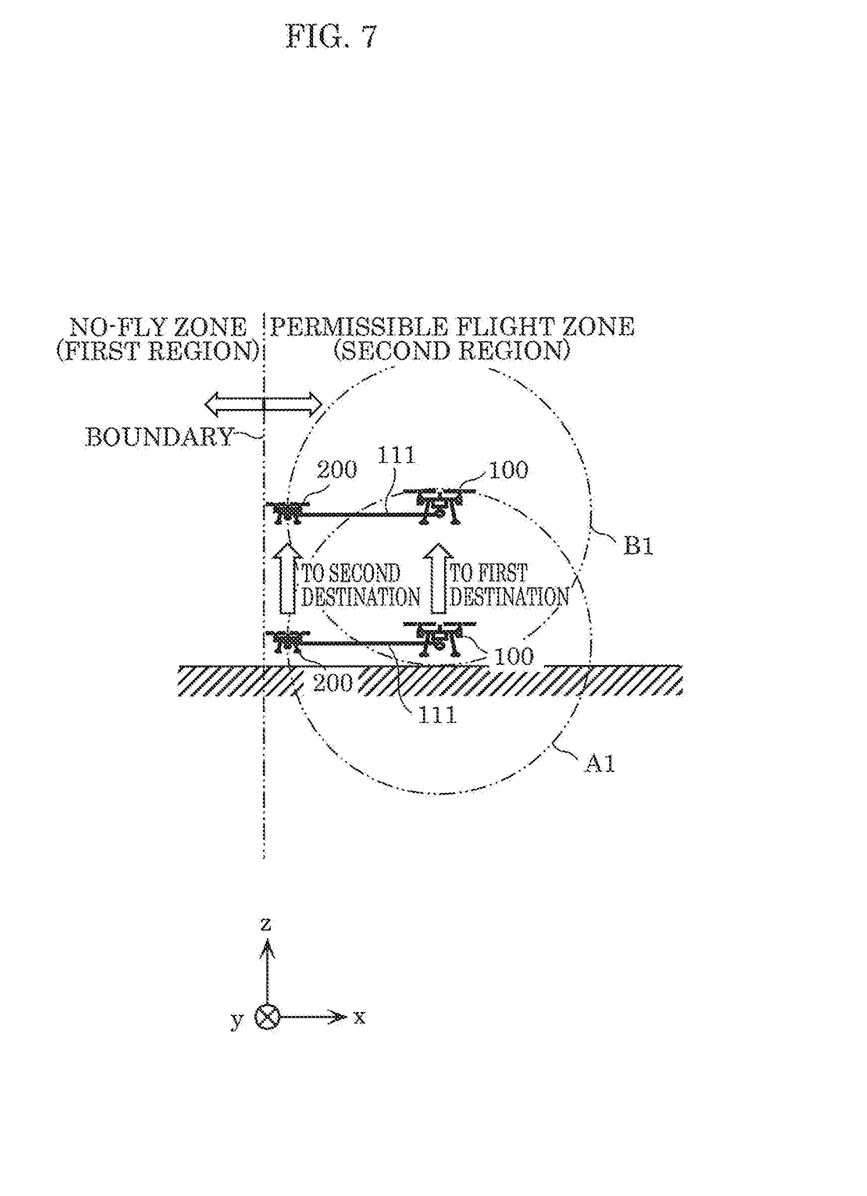
FIG. 7 is a diagram illustrating a specific example of the movement of a mobile tethering body to the first destination when the mobile tethering body is a flying machine.

FIG. 7 is a diagram illustrating a specific example of the movement of mobile tethering body 100 to the first destination when mobile tethering body 100 is a flying machine. FIG. 7 illustrates mobile tethering body 100 and unmanned aerial vehicle 200 before moved and mobile tethering body 100 and unmanned aerial vehicle 200 after moved. Mobile tethering body 100 and unmanned aerial vehicle 200 before moved are illustrated on the negative side of the z-axis, and mobile tethering body 100 and unmanned aerial vehicle 200 after moved are illustrated on the positive side of the z-axis.

Mobile tethering body 100 before moved is located at least the predetermined distance from the point on the boundary of the first region that is located the shortest distance from the position of unmanned aerial vehicle 200 before moved, in the direction from the point to the position of that unmanned aerial vehicle 200. Both mobile tethering body 100 and unmanned aerial vehicle 200 are present near the ground, and thus mobile tethering body 100 before moved is located in the aforementioned position, both when viewed from above in the air and when horizontally viewed. As a result, range A1 illustrated in FIG. 7, which has a radius equal to the length of tether 111 and in which unmanned aerial vehicle 200 before moved can move, does not reach the first region, and thus it possible to keep unmanned aerial vehicle 200 before moved from crossing the boundary.

Next, second obtainment unit 22 obtains first position information indicating, as the position of unmanned aerial vehicle 200, the second destination of unmanned aerial vehicle 200, and movement control unit 24 causes mobile tethering body 100 to the first destination according to the movement of unmanned aerial vehicle 200 to the second destination. Here, the second destination is in the air. Thus, movement control unit 24 causes mobile tethering body 100 to the first destination which is the position located at least the predetermined distance from the point on the boundary of the first region that is located the shortest distance from the position of unmanned aerial vehicle 200 in the air, in the direction from the point to the position of that unmanned aerial vehicle 200 (that is, at the same height as the second destination). Mobile tethering body 100 is a flying machine and thus is capable of moving to the first destination located at the same height as the second destination. In this way, mobile tethering body 100 moves to the first destination in such a manner that the point on the boundary of the first region that is located the shortest distance from the position of unmanned aerial vehicle 200, unmanned aerial vehicle 200, and mobile tethering body 100 are aligned in the stated order, overlapping when viewed in the direction perpendicular to the plane of the boundary. As a result, range B1 illustrated in FIG. 7, which has a radius equal to the length of tether 111 and in which unmanned aerial vehicle 200 after moved can move, does not reach the first region even when horizontally viewed, and thus it is possible to keep unmanned aerial vehicle 200 after moved from crossing the boundary.

Note that in the case where mobile tethering body 100 is a flying machine, mobile tethering body 100 needs to tether unmanned aerial vehicle 200 in the air and therefore is required to have, for example, a mass greater than the mass of unmanned aerial vehicle 200 and a propulsive force greater than the propulsive force of unmanned aerial vehicle 200.

Furthermore, in the case where mobile tethering body 100 is a flying machine, it is necessary to implement safety measures regarding mobile tethering body 100. A plausible example is to implement the safety measure set by the Japanese Ministry of Land, Infrastructure, Transport and Tourism which designates, as a restricted area prohibiting human entry, an area covering a distance dependent on the flight altitude of mobile tethering body 100 relative to mobile tethering body 100. In this case, the predetermined distance is set as the distance dependent on the flight altitude of mobile tethering body 100. Specifically, this distance is set to 30 m when mobile tethering body 100 flies at an altitude of 0 m to 20 m, is set to 40 m when mobile tethering body 100 flies at an altitude of 20 m to 50 m, is set to 60 m when mobile tethering body 100 flies at an altitude of 50 m to 100 m, and is set to 70 m when mobile tethering body 100 flies at an altitude of 100 m to 150 m.

Note that mobile tethering body 100 is not limited to a flying machine and may be a mobile crane or the like in which tether adjustment unit 110 (the root part of tether 111) is horizontally and vertically moveable.

[Operation of Control Device in Event of Malfunction]

Next, the operation of control device 10 when a malfunction has occurred with mobile tethering body 100 or unmanned aerial vehicle 200 will be described. As an example, suppose that mobile tethering body 100 is a flying machine.

When environmental information obtainment unit 25 obtains abnormal environmental information exceeding a predetermined criterion, warning presentation unit 26 presents this abnormality. A user who has checked the presentation provided by warning presentation unit 26 operates controller 300, for example, to cause unmanned aerial vehicle 200 to move to or land in the current position, the home position, or the like, and thus it is possible to keep unmanned aerial vehicle 200 from, for example, crashing into the ground due to windstorm, rain, or the like. In addition, movement control unit 24 causes mobile tethering body 100 to move to or land in the current position, the home position, or the like, and thus it is possible to keep mobile tethering body 100 from, for example, crashing into the ground due to windstorm, rain, or the like. Note that processor 20 may be used to cause unmanned aerial vehicle 200 to move to or land in the current position, the home position, or the like.

Furthermore, although not illustrated in the drawings, control device 10 includes, for example, a malfunction detection unit which detects malfunctions of mobile tethering body 100 and unmanned aerial vehicle 200 such as a lack of power supply, airframe abnormality, signal abnormality, and running out of control. As a result of processor 20 obtaining airframe information including information indicating whether or not mobile tethering body 100 and unmanned aerial vehicle 200 have these malfunctions, the malfunction detection unit can detect these malfunctions.

When a malfunction of unmanned aerial vehicle 200 is detected, warning presentation unit 26 presents the malfunction. A user who has checked the presentation provided by warning presentation unit 26 operates controller 300, for example, to cause unmanned aerial vehicle 200 to move to or land in the current position, the home position, or the like, and thus it is possible to keep unmanned aerial vehicle 200 from, for example, crashing into the ground due to the malfunction. In addition, movement control unit 24 causes mobile tethering body 100 to move to or land in the current position, the home position, or the like, and thus it is possible to keep mobile tethering body 100 from, for example, crashing into the ground due to the malfunction of unmanned aerial vehicle 200. Note that processor 20 may be used to cause unmanned aerial vehicle 200 to move to or land in the current position, the home position, or the like.

When a malfunction of mobile tethering body 100 is detected, warning presentation unit 26 presents the malfunction. A user who has checked the presentation provided by warning presentation unit 26 operates controller 300, for example, to cause unmanned aerial vehicle 200 to move to or land in the current position, the home position, or the like, and thus it is possible to keep unmanned aerial vehicle 200 from, for example, crashing into the ground due to the malfunction. In addition, movement control unit 24 causes mobile tethering body 100 to move to or land in the current position, the home position, or the like, and thus it is possible to keep mobile tethering body 100 from, for example, crashing into the ground due to the malfunction. Note that processor 20 may be used to cause unmanned aerial vehicle 200 to move to or land in the current position, the home position, or the like.

If mobile tethering body 100 approaches the boundary of the first region due to a malfunction of mobile tethering body 100, mobile tethering body 100 may shorten tether 111. If mobile tethering body 100 moves toward the boundary due to a malfunction of mobile tethering body 100, unmanned aerial vehicle 200 also moves toward the boundary the distance mobile tethering body 100 has moved, which may result in unmanned aerial vehicle 200 crossing the boundary; however, by shortening tether 111, it is possible to keep unmanned aerial vehicle 200 from crossing the boundary into the first region.

If mobile tethering body 100 moves away from the boundary of the first region due to a malfunction of mobile tethering body 100, mobile tethering body 100 may lengthen tether 111. If mobile tethering body 100 moves away from the boundary due to a malfunction of mobile tethering body 100, unmanned aerial vehicle 200 that is flying near the boundary may be forcibly pulled by mobile tethering body 100 and crash into the ground; however, by lengthening tether 111, it is possible to keep unmanned aerial vehicle 200 from being forcibly pulled by mobile tethering body 100.

Note that at the time of occurrence of a malfunction, in the case where the home position is closer to the boundary than the current position is, mobile tethering body 100 or unmanned aerial vehicle 200 may land in the current position rather than moving to the home position. This is because in the case where the home position is closer to the boundary than the current position is, the movement of mobile tethering body 100 or unmanned aerial vehicle 200 to the home position means causing mobile tethering body 100 or unmanned aerial vehicle 200 to approach the first region.

[Conclusion]

As described above, the first destination of mobile tethering body 100 is determined according to the position of unmanned aerial vehicle 200 so that the point on the boundary of the first region that is located the shortest distance from the position of unmanned aerial vehicle 200, unmanned aerial vehicle 200, and mobile tethering body 100 are linearly aligned in the stated order. When the length of tether 111 is adjusted so as not to increase any more in the aforementioned state where those are linearly aligned, the position in the aforementioned state is where unmanned aerial vehicle 200 is closest to the boundary, within the range of possible movement of unmanned aerial vehicle 200 that is limited by tether 111 and centered on mobile tethering body 100. In other words, even if unmanned aerial vehicle 200 runs out of control, for example, unmanned aerial vehicle 200 cannot move closer to the boundary than to the position in the aforementioned state, and thus it is possible to keep unmanned aerial vehicle 200 from crossing the boundary into the no-fly zone (first region), making it possible to improve the safety outside the region where unmanned aerial vehicle 200 flies.

Note that the situation in which the point on the boundary of the first region that is located the shortest distance from the position of unmanned aerial vehicle 200, unmanned aerial vehicle 200, and mobile tethering body 100 are linearly aligned in the stated order may means a situation in which these are linearly aligned when viewed from above in the air (along the z-axis), and may mean a situation in which there are linearly aligned when viewed horizontally (along the y-axis), and may mean a situation in which these are linearly aligned both when viewed from above in the air and when viewed horizontally, for example.

Other Embodiments

Although control device 10 according to the present disclosure has been described thus far based on the embodiment, the present disclosure is not limited to the above-described embodiment. Various modifications of the present embodiment as well as embodiments resulting from combinations of structural elements in different exemplary embodiments that may be conceived by a person having ordinary skill in the art are intended to be included within the scope of the present disclosure as long as these do not depart from the essence of the present disclosure.

For example, control device 10 is a PC or the like installed at an event site or the like in the above embodiment, but may be implemented as a server device or the like. Furthermore, the functional elements of control device 10 may spread across more than one server device.

Furthermore, for example, in the above embodiment, the first position information indicates, as the position of unmanned aerial vehicle 200, the second destination which is a destination of unmanned aerial vehicle 200, but this is not limiting. For example, the first position information may indicate the current position of unmanned aerial vehicle 200.

Furthermore, for example, the position of unmanned aerial vehicle 200 is obtained using the GPS in the above embodiment, but this is not limiting. For example, the position of unmanned aerial vehicle 200 with respect to mobile tethering body 100 may be calculated using the length of tether 111 and the direction in which tether 111 extends. Furthermore, for example, the position of unmanned aerial vehicle 200 may be estimated by image recognition based on image capture by unmanned aerial vehicle 200. Various other known position measuring means may be used to obtain the position of unmanned aerial vehicle 200.

Furthermore, for example, in the above embodiment, unmanned aerial vehicle 200 is tethered by single mobile tethering body 100, but this is not limiting. For example, unmanned aerial vehicle 200 may be tethered by more than one mobile tethering body 100. In this case, the mass or propulsive force of one mobile tethering body 100 can be reduced. Furthermore, even if one of the plurality of mobile tethering bodies 100 is broken, unmanned aerial vehicle 200 can be tethered by remaining mobile tethering bodies 100, and thus it is possible to keep unmanned aerial vehicle 200 from instantly becoming unable to be tethered.

Furthermore, for example, in the above embodiment, the boundary between the first region and the second region extends vertically, but this is not limiting. For example, the boundary may extend horizontally. For example, when there is an altitude limit for the flight of unmanned aerial vehicle 200, there are cases where a horizontally extending boundary is set.

Furthermore, for example, mobile tethering body 100 may include the functions of control device 10, and thus the present disclosure may be implemented as such mobile tethering body 100. Specifically, mobile tethering body 100 may include: first obtainment unit 21 which obtains first region information indicating a first region; second obtainment unit 22 which obtains first position information indicating the position of unmanned aerial vehicle 200; determination unit 23 which determines a first destination which is a destination of mobile tethering body 100 using the first region information and the first position information; and, movement control unit 24 which moves mobile tethering body 100 to the first destination.

Furthermore, the present disclosure can be implemented not only as control device 10 and mobile tethering body 100, but also as an information processing method including steps (processes) which the structural elements included in control device 10 and mobile tethering body 100 perform.

Specifically, as illustrated in FIG. 2, the information processing method including the following steps performed using processor 20: obtaining first region information indicating a first region (Step S11); obtaining first position information indicating the position of unmanned aerial vehicle 200 tethered to mobile tethering body 100 using tether 111 (Step S12); determining a first destination which is a destination of mobile tethering body 100 using the first region information and the first position information (Step S13); and moving mobile tethering body 100 to the first destination (Step S14). The first destination is a position located at least a predetermined distance from a point which is on the boundary of the first region and located the shortest distance from the position of unmanned aerial vehicle 200, in the direction from the point on the boundary of the first region to the position of unmanned aerial vehicle 200.

Furthermore, for example, these steps may be performed by a computer (computer system). The present disclosure can be implemented as a program which causes the computer to perform the steps included in the method. Furthermore, the present disclosure can be implemented as a non-transitory, computer-readable recording medium such as a CD-ROM including the program recorded thereon.

For example, in the case where the present disclosure is implemented as a program (software), the steps are performed by executing the program using hardware resources such as a central processing unit (CPU), a memory, and an input/output circuit of the computer. Specifically, the steps are performed as a result of the CPU obtaining data from the memory, the input/output circuit, or the like, performing calculations, and outputting the calculation result to the memory, the input/output circuit, or the like.

Furthermore, each of the structural elements included in control device 10 and mobile tethering body 100 according to the above embodiment may be implemented as a dedicated or general-purpose circuit. These structural elements may be implemented as a single circuit or may be implemented as two or more circuits.

Furthermore, the structural elements included in control device 10 and mobile tethering body 100 according to the above embodiment may be implemented as large-scale integration (LSI) which is an integrated circuit (IC). These structural elements may be integrated into individual chips, or a portion or all of the structural elements may be integrated into one chip. Depending on the degree of integration, the LSI may also be referred to as system LSI, super LSI, or ultra LSI.

Moreover, the integrated circuit is not limited to the LSI and may be implemented as a dedicated circuit or a general-purpose processor. A field programmable gate array (FPGA) that can be programmed or a reconfigurable processor that allows reconfiguration of the connection or configuration of the inner circuit cells of the LSI can be used for the same purpose.

In addition, depending on the emergence of circuit integration technology that replaces LSI due to progress in semiconductor technology or other derivative technology, it is, obvious that such technology may be used to configure the structural elements included in control device 10 and mobile tethering body 100 as integrated circuits.

Forms obtained by various modifications to the exemplary embodiment that can be conceived by a person having ordinary skill in the art as well as forms realized by arbitrarily combining structural elements and functions in the exemplary embodiment which are within the scope of the essence of the present disclosure are included in the present disclosure.

What is claimed is:

1. An information processing method, comprising the following steps performed using a processor:
   obtaining first region information indicating a first region;
   obtaining first position information indicating a position of an unmanned aerial vehicle tethered to a mobile tethering body using a tether;
   determining a first destination using the first region information and the first position information, the first destination being a destination of the mobile tethering body; and
   moving the mobile tethering body to the first destination, wherein
   the first destination is a position located at least a predetermined distance from a point on a boundary of the first region in a direction from the point on the boundary of the first region to the position of the unmanned aerial vehicle, the point being located a shortest distance from the position of the unmanned aerial vehicle.

2. The information processing method according to claim 1, wherein
   the first position information indicates a second destination as the position of the unmanned aerial vehicle, the second destination being a destination of the unmanned aerial vehicle, and
   the information processing method further comprises:
   moving mobile tethering body to the first destination according to movement of the unmanned aerial vehicle to the second destination.

3. The information processing method according to claim 1, wherein
   the tether has a length dependent on the predetermined distance.

4. The information processing method according to claim 1, wherein
   the tether is variable in length, and
   the information processing method further comprises:
   causing the mobile tethering body to change the length of the tether according to a positional relationship between the unmanned aerial vehicle and the mobile tethering body.

5. The information processing method according to claim 1, wherein
   the predetermined distance is less than or equal to a radius of curvature of the boundary at the point.

6. The information processing method according to claim 1, further comprising:
   detecting a malfunction of the mobile tethering body; and
   causing the mobile tethering body to shorten the tether when the mobile tethering body approaches the boundary of the first region.

7. The information processing method according to claim 1, further comprising:
   detecting a malfunction of the mobile tethering body; and
   causing the mobile tethering body to lengthen the tether when the mobile tethering body moves away from the boundary of the first region.

8. A control device, comprising a processor which is configured to:
   obtain first region information indicating a first region;
   obtain first position information indicating a position of an unmanned aerial vehicle tethered to a mobile tethering body using a tether;
   determine a first destination using the first region information and the first position information, the first destination being a destination of the mobile tethering body; and
   move the mobile tethering body to the first destination, wherein
   the first destination is a position located at least a predetermined distance from a point on a boundary of the first region in a direction from the point on the boundary of the first region to the position of the unmanned aerial vehicle, the point being located a shortest distance from the position of the unmanned aerial vehicle.

9. A mobile tethering body which tethers an unmanned aerial vehicle using a tether, the mobile tethering body comprising a processor which is configured to:
   obtain first region information indicating a first region;
   obtain first position information indicating a position of the unmanned aerial vehicle;
   determine a first destination using the first region information and the first position information, the first destination being a destination of the mobile tethering body; and
   move the mobile tethering body to the first destination, wherein
   the first destination is a position located at least a predetermined distance from a point on a boundary of the first region in a direction from the point on the boundary of the first region to the position of the unmanned aerial vehicle, the point being located a shortest distance from the position of the unmanned aerial vehicle.

* * * * *